US008817866B2

(12) United States Patent
Jeong et al.

(10) Patent No.: US 8,817,866 B2
(45) Date of Patent: *Aug. 26, 2014

(54) DATA EQUALIZING CIRCUIT AND DATA EQUALIZING METHOD

(75) Inventors: Chun Seok Jeong, Icheon-si (KR); Jae Jin Lee, Icheon-si (KR); Chang Sik Yoo, Seoul (KR); Jang Woo Lee, Seoul (KR); Seok Joon Kang, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 176 days.

This patent is subject to a terminal disclaimer.

(21) Appl. No.: 13/407,478

(22) Filed: Feb. 28, 2012

(65) Prior Publication Data

US 2013/0170536 A1  Jul. 4, 2013

(30) Foreign Application Priority Data

Dec. 29, 2011 (KR) .......................... 10-2011-0146451

(51) Int. Cl.
 *H03H 7/30* (2006.01)
(52) U.S. Cl.
 USPC ........... 375/232; 375/230; 375/229; 375/226; 375/233; 375/316
(58) Field of Classification Search
 USPC .................. 375/230, 232, 229, 226, 233, 316
 See application file for complete search history.

(56) References Cited

U.S. PATENT DOCUMENTS

| 7,760,798 | B2 * | 7/2010 | Hidaka | 375/232 |
| 8,194,727 | B2 * | 6/2012 | Yamazaki et al. | 375/232 |
| 8,520,725 | B2 * | 8/2013 | Jeong et al. | 375/232 |
| 2005/0226355 | A1 * | 10/2005 | Kibune et al. | 375/348 |
| 2007/0297248 | A1 * | 12/2007 | Hidaka | 365/189.05 |
| 2008/0107167 | A1 * | 5/2008 | Tung et al. | 375/232 |
| 2010/0238993 | A1 * | 9/2010 | Huang et al. | 375/233 |
| 2010/0329327 | A1 * | 12/2010 | Kato et al. | 375/233 |
| 2011/0317751 | A1 * | 12/2011 | Roethig et al. | 375/232 |

OTHER PUBLICATIONS

Seok Jun Kang, A 4.2Gb/s 10x OSR Adaptive Equalizer Using 1.4x Fractional Sampling Clock, Feb. 2011, 59 pages.
Jang-Woo Lee et al., Oversampling equalizer with sub-sample clock, 2011, Hanyang University, Republic of Korea.

* cited by examiner

*Primary Examiner* — Kenneth Lam
(74) *Attorney, Agent, or Firm* — William Park & Associates Ltd.

(57) ABSTRACT

A data equalizing circuit includes an equalizer configured to output data according to a control code; and a detection unit configured to divide the data into N number of calculation periods, count data transition frequencies for the N calculation periods, calculate dispersion values of the data transition frequencies for the N calculation periods, and output the control code corresponding to a largest dispersion value, in response to a counting interruption signal and a counting completion signal, wherein n is equal to or greater than 2, N is greater than n, and the data is divided to n number of unit intervals (UI), and wherein a phase shift of each of the calculation periods with respect to its corresponding UI is different from a phase shift of any of the other calculation periods with respect to its corresponding UI.

12 Claims, 6 Drawing Sheets

DATA EQUALIZING CIRCUIT AND DATA EQUALIZING METHOD

CROSS-REFERENCES TO RELATED APPLICATION

The present application claims priority under 35 U.S.C. §119(a) to Korean application number 10-2011-0146451 filed on Dec. 29, 2011 in the Korean Intellectual Property Office, which is incorporated by reference in its entirety.

BACKGROUND

1. Technical Field

The present invention relates to processing data, and more particularly, to a data equalizing circuit of a data receiver circuit and a data equalizing method in a data receiver circuit.

2. Related Art

A data receiver circuit for receiving and outputting data has a data equalizing circuit to correct transformation occurring in the course of transmitting data.

FIG. 1 is a circuit diagram of a conventional data equalizing circuit.

The conventional data equalizing circuit includes an equalizer 1 and a detection unit 2.

The equalizer 1 corrects data DATA_IN according to a value of a control code EQ_CODE and outputs DATA_OUT. The detection unit 2 outputs the control code EQ_CODE based on a degree of transformation of the data DATA_OUT. The detection unit 2 detects a degree of transformation of the data DATA_OUT according to a scheme of detecting transition positions of the data DATA_OUT.

FIG. 2 is a waveform diagram showing the scheme of detecting transition positions of the data DATA_OUT in the detection unit 2.

The detection unit 2 divides 1 UI (unit interval) of the data DATA_OUT, which is the data DATA_IN corrected according to the value of the control code EQ_CODE, into a plurality of periods (ten periods in this case), and counts data transition positions in synchronization with sampling clocks CLK(1) to CLK(10). The sampling clocks CLK(1) to CLK (10) have a phase difference acquired by dividing 1 UI by 10. Then, dispersions of counting values are calculated. This process is performed for all respective values of the control code EQ_CODE while changing the value of the control code EQ_CODE. Finally, the detection unit 2 outputs the value of the control code EQ_CODE corresponding to the largest dispersion value found.

In order to more precisely figure out a data transition distribution, an increased number of sampling clocks, which have uniform phase differences, are needed in 1 UI. In this regard, if a number of sampling clocks with a high frequency are generated, additional hardware may be needed, and power consumption may increase.

SUMMARY

A data equalizing circuit and a data equalizing method in which a data transformation detection scheme is improved are described.

In one embodiment of the present invention, a data equalizing circuit includes: an equalizer configured to output data according to a control code; and a detection unit configured to divide the data into N number of calculation periods, count data transition frequencies for the N calculation periods, calculate dispersion values of the data transition frequencies for the N calculation periods, and output the control code corresponding to a largest dispersion value, in response to a counting interruption signal and a counting completion signal, wherein n is equal to or greater than 2, N is greater than n, the data is divided to n number of unit intervals (UI), and wherein a phase shift of each of the calculation periods with respect to its corresponding UI is different from a phase shift of any of the other calculation periods with respect to its corresponding UI.

In another embodiment of the present invention, a data equalizing method suitable for controlling a correction degree of a data eye in response to a value of a control code with a plurality of bits includes: dividing data into N number of calculation periods, and counting data transition frequencies for the N calculation periods while changing the value of the control code, and interrupting the counting for a corresponding control code when counts of all of the data transition frequencies for the N calculation periods is non-zero, while performing the counting; calculating dispersion values of data transition frequencies for the calculation periods of the data from the data transition frequencies according to respective values of the control code; and outputting the value of the control code when a dispersion value is largest among the dispersion values of the data transition frequencies for the calculation periods, as a final control code, wherein the calculating of the dispersion values is not performed for the corresponding control code for which the counting is interrupted, and wherein n is equal to or greater than 2, N is greater than n, and the data is divided to n number of unit intervals (UI), and wherein a phase shift of each of the calculation periods with respect to its corresponding UI is different from a phase shift of any of the other calculation periods with respect to its corresponding UI.

BRIEF DESCRIPTION OF THE DRAWINGS

Features, aspects, and embodiments are described in conjunction with the attached drawings, in which.

DETAILED DESCRIPTION

A data equalizing circuit and a data equalizing method according to the present invention will be described below with reference to the accompanying drawings through exemplary embodiments.

Figure 1:
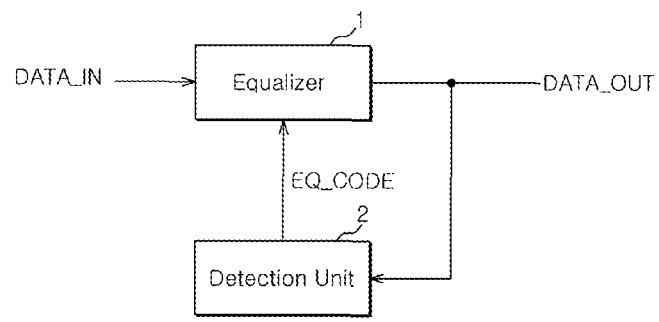
FIG. 1 is a circuit diagram of a conventional data equalizing circuit.
Figure 2:
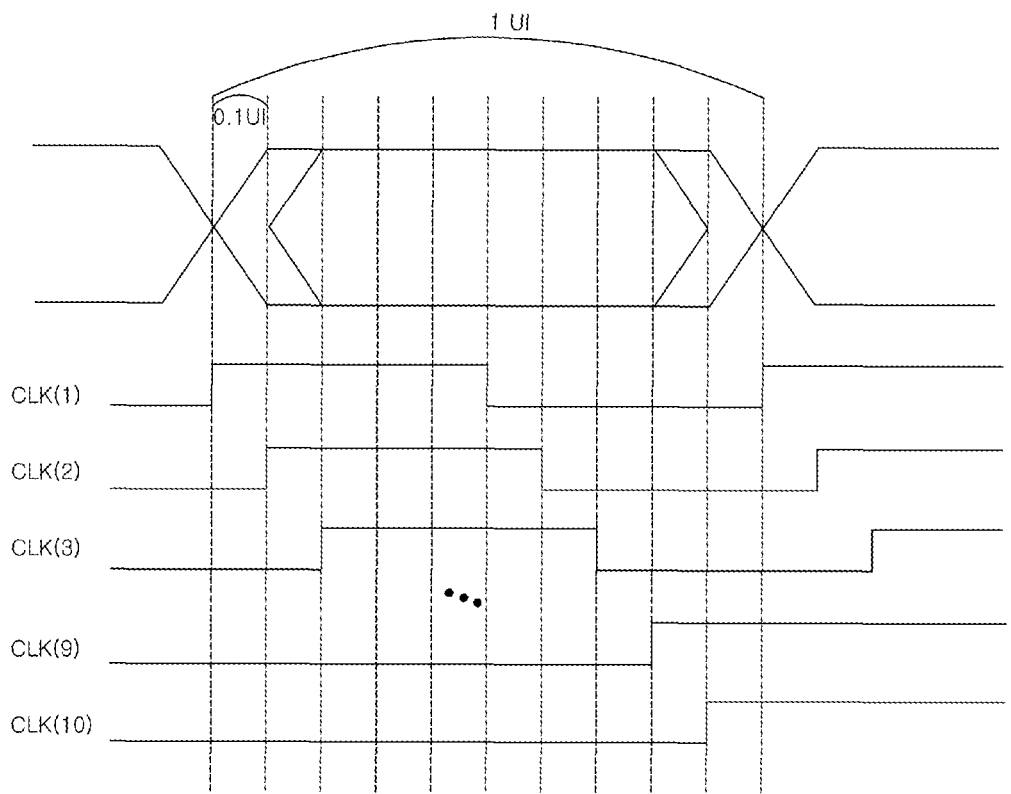
FIG. 2 is a waveform diagram showing a data transition detecting scheme of the conventional data equalizing circuit.
Figure 3:
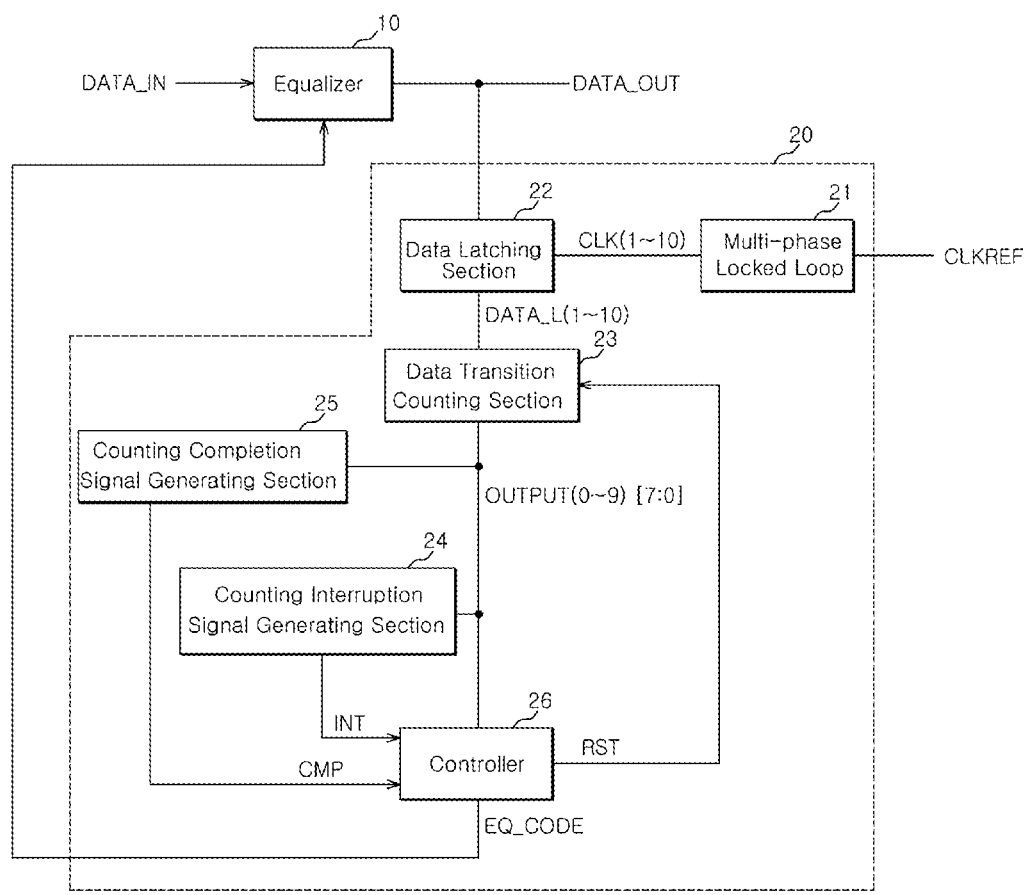
FIG. 3 is a circuit diagram of a data equalizing circuit in accordance with an exemplary embodiment of the present invention.

FIG. 3 is a circuit diagram of a data equalizing circuit in accordance with an exemplary embodiment of the present invention.

The data equalizing circuit includes an equalizer 10 and a detection unit 20.

The equalizer 10 is configured to control the gain of data DATA_IN according to a value of a control code EQ_CODE and correct the transformation of the data DATA_IN to output data DATA_OUT. The equalizer 10 may be realized as is generally known in the art.

The detection unit 20 is configured to detect a degree of transformation of the data DATA_OUT while changing the value of the control code EQ_CODE, and output a value of the control code EQ_CODE as a final value. The detection unit 20 detects a degree of transformation of the data DATA_OUT according to a scheme of detecting transition positions of the data DATA_OUT.

In detail, the detection unit 20 divides a data DATA_OUT into n UIs and then further divides the n UIs into N calculation periods. Accordingly, each of the N calculation periods may be n/N UI in length. The detection unit 20 counts data transition frequencies OUTPUT(0~9) of respective N calculation periods while changing the value of the control code EQ_CODE, calculates dispersion values of data transition frequencies for each of the N calculation periods, and finally outputs the value of the control code EQ_CODE that corresponds to a largest dispersion value found.

The detection unit 20 includes a multi-phase locked loop 21, a data latching section 22, a data transition counting section 23, and a controller 26.

The multi-phase locked loop 21 is configured to receive a reference clock CLKREF and output N number of clocks CLK(1~10) having a frequency corresponding to 1/n times the frequency of the data DATA_OUT with a phase difference of n/N. n has a value equal to or greater than 2 and is set such that each of the N number of clocks CLK(1~10) has a phase shift greater than zero degrees and less than 360 degrees with respect to each of the other of the clocks CLK(1~10). Each of the clocks CLK(1~10) has a different phase shift than each of the other clocks CLK(1~10). The multi-phase locked loop 21 is a phased locked loop (PLL) used for changing a frequency and/or a phase and may be realized as is generally known in the art.

The data latching section 22 is configured to store the data DATA_OUT as N number of latched data DATA_L(1~10) in synchronization with the N number of clocks CLK(1~10). The data latching section 22 may be realized by, for example, flip-flops or latches.

The data transition counting section 23 is configured to compare adjacent values among the N number of latched data DATA_L(1~10), check whether a data transition occurs in the respective N periods, and count the data transition frequencies OUTPUT(0~9) for the respective n/N periods.

The controller 26 is configured to calculate data transition frequencies in each of the N calculation periods while changing the value of the control code EQ_CODE. Further, the controller 26 calculates and stores dispersion values of the data transition frequencies for the N calculation periods, and finally outputs the value of the control code EQ_CODE for which a dispersion value is largest.

The detection unit 20 may further include a counting interruption signal generating section 24 configured to generate a counting interruption signal INT. The counting interruption signal INT is a signal that indicates that calculation of a corresponding control code EQ_CODE should be interrupted. The detection unit 20 calculates the dispersion values of the data transition frequencies for the N calculation periods of the data DATA_OUT, and outputs the largest dispersion value found as the control code EQ_CODE. This is because the largest dispersion value may correlate to a largest data eye of data given the control codes EQ_CODE used. Therefore, it may be sub-optimal to calculate a dispersion value where the width of a data eye according to a corresponding control code EQ_CODE is smaller than the n/N UI interval between the clocks CLK(1~10) for sampling the data. Hence, in such a case, the counting interruption signal generating section 24 controls the detection unit 20 such that counting is interrupted and a change is made to a next control code EQ_CODE.

Also, the detection unit 20 may further include a counting completion signal generating section 25 configured to generate a counting completion signal CMP. The detection unit 20 attempts to update the control code EQ_CODE to a more optimal value in the process of detecting a data transformation. In such a process, the counting completion signal CMP is a signal which is asserted when counting of the data transition frequencies OUTPUT(0~9) for the N calculation periods in respect of a corresponding control code EQ_CODE is completed. If the asserted counting completion signal CMP is inputted to the controller 26, the controller 26 calculates and stores dispersion values corresponding to the corresponding control code EQ_CODE. Generally, in a positive logic circuit an output of logical '1' is an asserted signal, and an output of logical '0' is a deasserted signal. For ease of explanation, the various embodiments disclosed will be assumed to use positive logic. However, various embodiments of the invention may also use negative logic where an output of logical '1' is a deasserted signal, and an output of logical '0' is an asserted signal.

Figure 4:
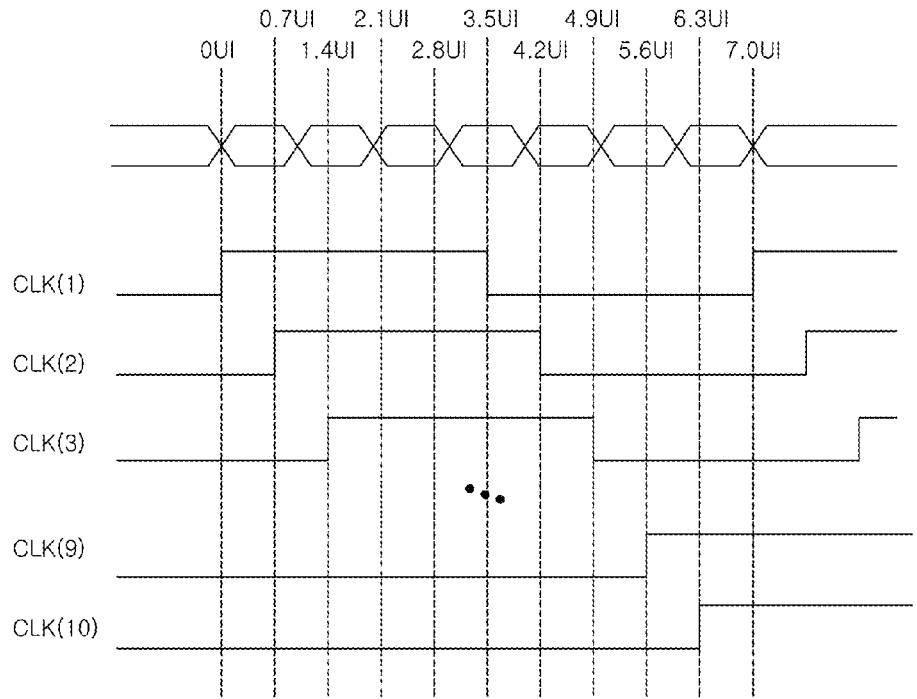
FIG. 4 is a waveform diagram showing a data transition detecting scheme of the data equalizing circuit in accordance with an exemplary embodiment of the present invention.

FIG. 4 is a waveform diagram showing a data transition detecting scheme of the data equalizing circuit in accordance with an embodiment of the present invention.

Referring to FIG. 4, in an exemplary embodiment of the present invention, data transition frequencies are counted using the clocks CLK(1~10) having a frequency lower than the frequency of the data DATA_OUT. In FIG. 4, clocks CLK(1~10) having a frequency corresponding to 1/7 (that is, n=7) times the frequency of the data DATA_OUT are used. Also, data transition frequencies for respective calculation periods are counted not by dividing the period of 1 UI (that is, 1 cycle of data) by N as in the conventional art but by assigning the data period to n UI cycles, and dividing the n UI cycles by N. In FIG. 4, data of n cycles are divided into 10 periods (N=10). Accordingly, for n=7, and N=10, each calculation period is 7/10 of a UI cycle, where there are 7 UI cycles in a data period.

In order to ensure that the data transition frequencies for respective periods do not overlap with one another, setting is made such that clock positions of respective N calculation periods on the data DATA_OUT are different from one another. This is a necessary condition that is important for subsequently calculating data transition frequencies for the N calculation periods. In FIG. 4, a first calculation period corresponds to 0 UI to 0.7 UI, a second calculation period corresponds to 0.7 UI to 1.4 UI, a third calculation period corresponds to 1.4 UI to 2.1 UI, a fourth calculation period corresponds to 2.1 UI to 2.8 UI, a fifth calculation period corresponds to 2.8 UI to 3.5 UI, a sixth calculation period corresponds to 3.5 UI to 4.2 UI, a seventh calculation period corresponds to 4.2 UI to 4.9 UI, an eighth calculation period corresponds to 4.9 UI to 5.6 UI, a ninth calculation period corresponds to 5.6 UI to 6.3 UI, and a tenth calculation period corresponds to 6.3 UI to 7.0 UI. Since the boundaries of the respective calculation periods are different from one another, it can be seen that the positions of the respective N calculation periods on the data DATA_OUT are different from one another. All values of n and N satisfying this may be applied to various embodiments of the present invention.

In various embodiments of the present invention, since data transitions are detected using clocks having a frequency lower than that used in the conventional art, precise detection may be implemented while hardware design burden and current consumption may be reduced.

Figure 5:
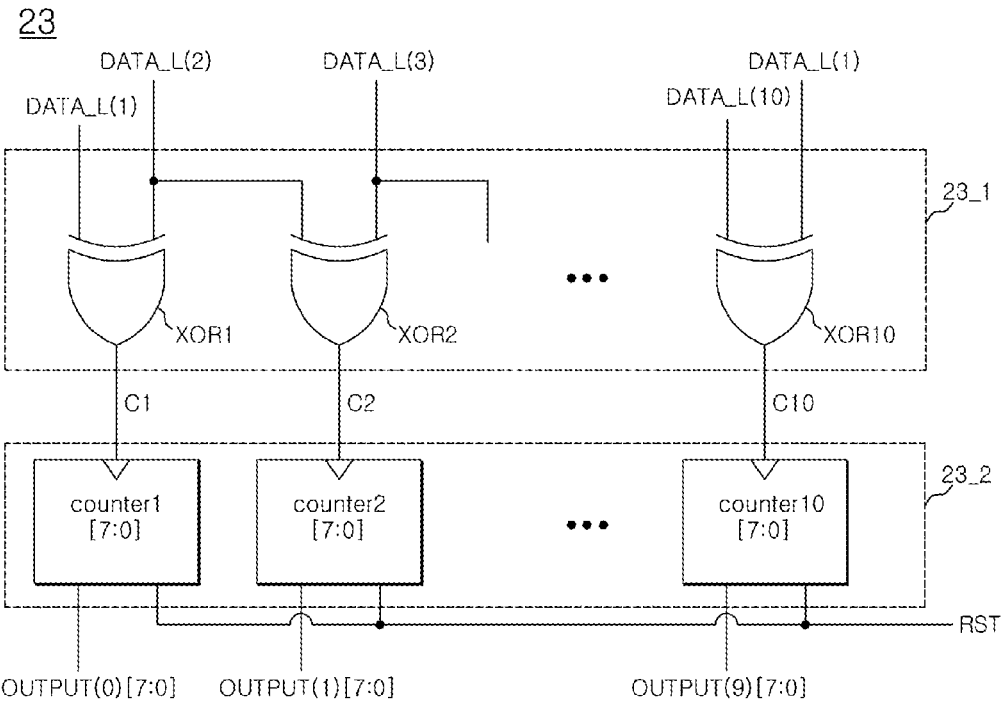
FIG. 5 is a circuit diagram showing an exemplary embodiment of the data transition counting section shown in FIG. 3.

FIG. 5 is a circuit diagram showing an exemplary embodiment of the data transition counting section 23 shown in FIG. 3.

The data transition counting section 23 includes a comparison part 23_1 and a counter part 23_2.

The comparison part 23_1 includes N number of XOR gates XOR1 to XOR10 configured to XOR the adjacent values of the N number of latched data DATA_L(1~10) and generate N number of comparison signals C1 to C10. The XOR gates XOR1 to XOR10 output 1 when the adjacent values of the latched data DATA_L(1~10) are different from each other and output 0 when the adjacent values of the latched data DATA_L(1~10) are the same.

In the comparison part 23_1, the first latched data DATA_L(1) is compared with the second latched data DATA_L(2), the second latched data DATA_L(2) is compared with the third latched data DATA_L(3), the third latched data DATA_L(3) is compared with the fourth latched data DATA_L(4), the fourth latched data DATA_L(4) is compared with the fifth latched data DATA_L(5), the fifth latched data DATA_L(5) is compared with the sixth latched data DATA_L(6), the sixth latched data DATA_L(6) is compared with the seventh latched data DATA_L(7), the seventh latched data DATA_L(7) is compared with the eighth latched data DATA_L(8), the eighth latched data DATA_L(8) is compared with the ninth latched data DATA_L(9), the ninth latched data DATA_L(9) is compared with the tenth latched data DATA_L(10), and the tenth latched data DATA_L(10) is compared with the first latched data DATA_L(1).

When values of adjacent latched data DATA_L(1~10) are the same, it means that data values have not changed and thus a data transition has not occurred through adjacent periods. When values of adjacent latched data DATA_L(1~10) are different, it means that data values have changed and thus a data transition has occurred in adjacent periods.

The counter part 23_2 includes N number of counters counter1 to counter10 configured to respectively count the N number of comparison signals C1 to C10 and output the data transition frequencies OUTPUT(0~9) for the N calculation periods. The counters counter1 to counter10 may have a plurality of bits such as, for example, 8 bits [7:0]. The counters counter1 to counter10 initialize counted values when an asserted reset signal RST is applied. The counted value may be initialized to, for example, zero.

Further, the counters counter1 to counter10 may be set to count the comparison signals C1 to C10 in synchronization with a control clock (not shown).

The data transition frequencies OUTPUT(0~9) for the N calculation periods outputted from the counter part 23_2 are values acquired by counting data transition frequencies for periods obtained by dividing the data DATA_OUT by n/N, and are subsequently used to calculate data transition frequencies for the N calculation periods.

Figure 6:
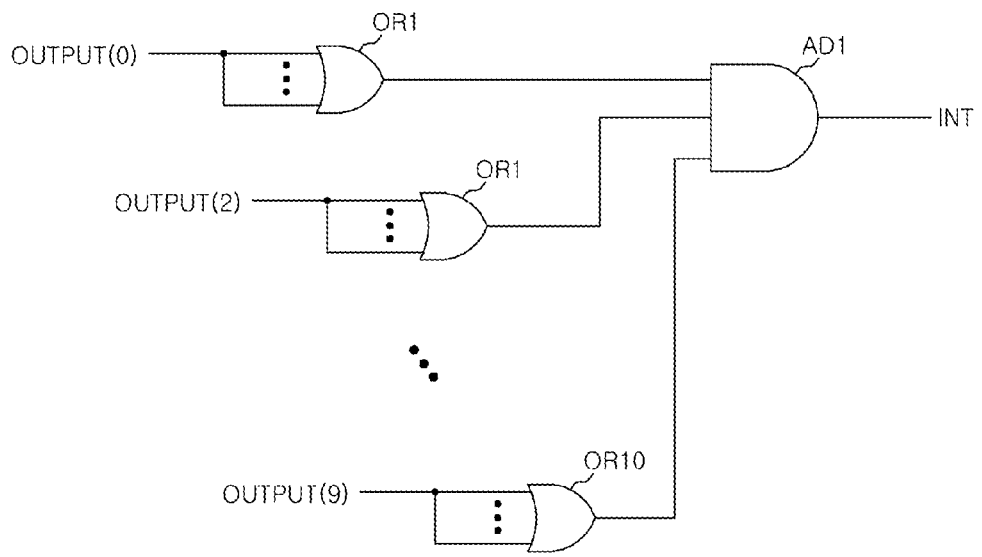
FIG. 6 is a circuit diagram showing an exemplary embodiment of the counting interruption signal generating section shown in FIG. 3.

FIG. 6 is a circuit diagram showing an exemplary embodiment of the counting interruption signal generating section 24 shown in FIG. 3.

The counting interruption signal generating section 24 includes N number of OR gates OR1 to OR10 configured to receive respective bit values of the data transition frequencies OUTPUT(0~9) for the respective calculation periods and an AND gate AD1 configured to receive the outputs of the N number of OR gates OR1 to OR10.

If any one of the data transition frequencies OUTPUT(0~9) for the respective periods has the value of zero, this means that a data eye is at least larger than 0.7 UI. This is because a data transition has not occurred in that respective calculation period. Since the value of at least one of the inputs to the AND gate AD1 is zero, or deasserted, the counting interruption signal INT is also zero, or deasserted. The counter part 23_2 counts while the counting interruption signal INT is deasserted.

Conversely, if all the data transition frequencies OUTPUT(0~9) for the respective periods are non-zero, this means that a data eye is smaller than 0.7 UI. Thus, it is not necessary to further perform a detecting operation for the present control code EQ_CODE. In this case, since the values of the inputs to the AND gate AD1 are all 1, the counting interruption signal INT with the value of 1 is outputted. As the asserted counting interruption signal INT is generated, the controller 26 receiving the asserted counting interruption signal INT changes the control code EQ_CODE to a next control code EQ_CODE.

Therefore, the counting interruption signal generating section 24 may shorten a time needed for detecting an optimal control code EQ_CODE.

Figure 7:
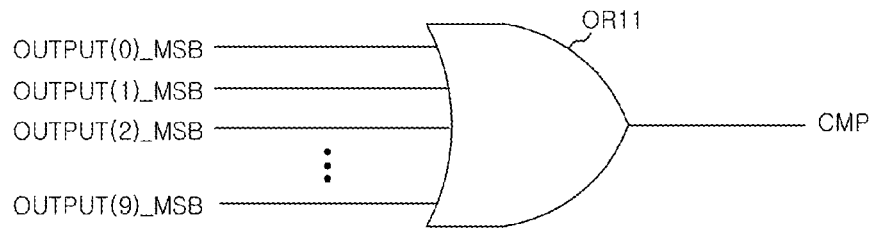
FIG. 7 is a circuit diagram showing an exemplary embodiment of the counting completion signal generating section shown in FIG. 3.

FIG. 7 is a circuit diagram showing an exemplary embodiment of the counting completion signal generating section 25 shown in FIG. 3.

The counting completion signal generating section 25 includes an OR gate OR11 configured to be inputted with most significant bits OUTPUT(0~9)_MSB of the data transition frequencies OUTPUT(0~9) for the N calculation periods and output the counting completion signal CMP.

As described above, the counting completion signal CMP is asserted when counting of the data transition frequencies OUTPUT(0~9) for the N calculation periods for a corresponding control code EQ_CODE is completed. In the case where any one of the most significant bits OUTPUT(0~9)_MSB of the data transition frequencies OUTPUT(0~9) for the n/N periods is 1, the counting completion signal CMP has the value of 1, or is asserted. If the asserted counting completion signal CMP is inputted to the controller 26, the controller 26 calculates and stores dispersion values corresponding to the corresponding control code EQ_CODE. Note that various other implementations can be used to detect an end count. For example, a counter itself can output a signal when its count is at a maximum count. Or, an AND gate can detect when all of the count bits are '1'.

Figure 8:
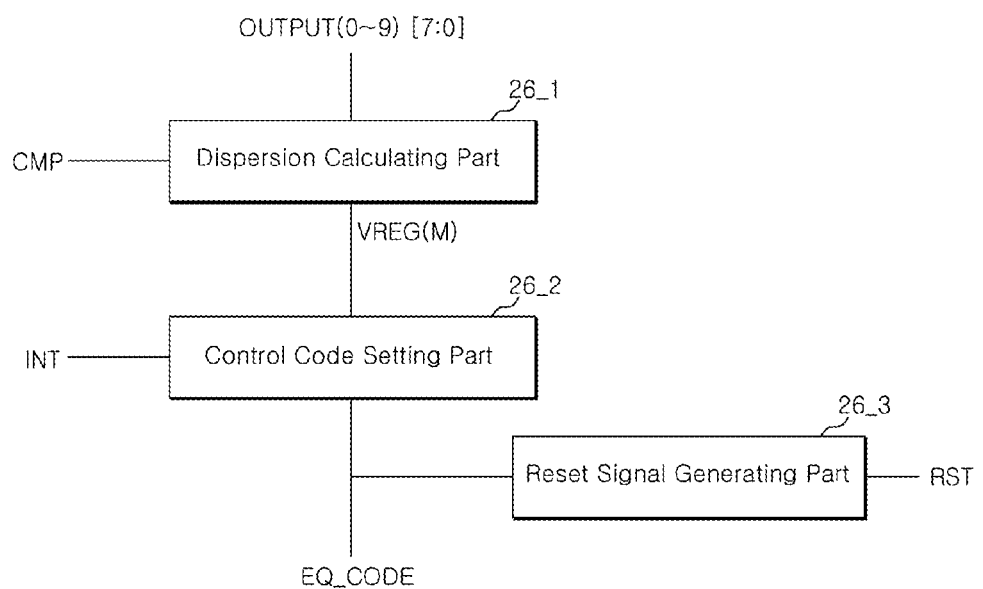
FIG. 8 is a circuit diagram showing an exemplary embodiment of the controller shown in FIG. 3.

FIG. 8 is a circuit diagram showing an exemplary embodiment of the controller 26 shown in FIG. 3.

The controller 26 includes a dispersion calculating part 26_1 and a control code setting part 26_2.

The dispersion calculating part 26_1 is configured to receive the data transition frequencies OUTPUT(0~9) for the N calculation periods, calculate the data transition frequencies for the N calculation periods, and calculate and output dispersion values VREG(M) of the data transition frequencies for the N calculation periods.

The dispersion calculating part 26_1 may receive the counting completion signal CMP. Since the counting completion signal CMP indicates completion of counting, the dispersion calculating part 26_1 receives the data transition frequencies OUTPUT(0~9) for the N calculation periods.

The control code setting part 26_2 is configured to store the dispersion values VREG(M) for the respective values of the control code EQ_CODE while changing the value of the control code EQ_CODE, and output the value of the control code EQ_CODE corresponding to the largest dispersion value VREG(M).

The control code setting part 26_2 may receive an asserted counting interruption signal INT that indicates that counting for a corresponding control code EQ_CODE should be interrupted. Accordingly, the value of the control code EQ_CODE is changed to a next value.

Various embodiments of the present invention are directed to derive the value of a control code EQ_CODE for correcting data DATA_IN. To this end, the control code setting part 26_2 stores the dispersion values VREG(M) for the respective values of the control code EQ_CODE while changing the value of the control code EQ_CODE, and outputs the value of a control code EQ_CODE corresponding to the largest dispersion value VREG(M). The largest dispersion value VREG(M) may correspond to a largest data eye found.

The control code EQ_CODE may comprise, for example, 3 bits and may range from 000 to 111 for a total of eight different values.

The controller 26 may further include a reset signal generating part 26_3. In an embodiment of the present invention, the data transition frequencies are counted while the value of the control code EQ_CODE is changed. Accordingly, when the value of the control code EQ_CODE is changed by the control code setting part 26_2, it may be necessary to reset all the counters counter1 to counter10 so as to start a new count of the data transition frequencies for the changed value of the control code EQ_CODE.

The reset signal generating part 26_3 is configured to output the asserted reset signal RST when the control code setting part 26_2 changes the value of the control code EQ_CODE.

The counter part 23_2 of the data transition counting section 23 initializes counted data transition frequencies OUTPUT(0~9) for the N calculation periods when the asserted reset signal RST is applied.

Figure 9:
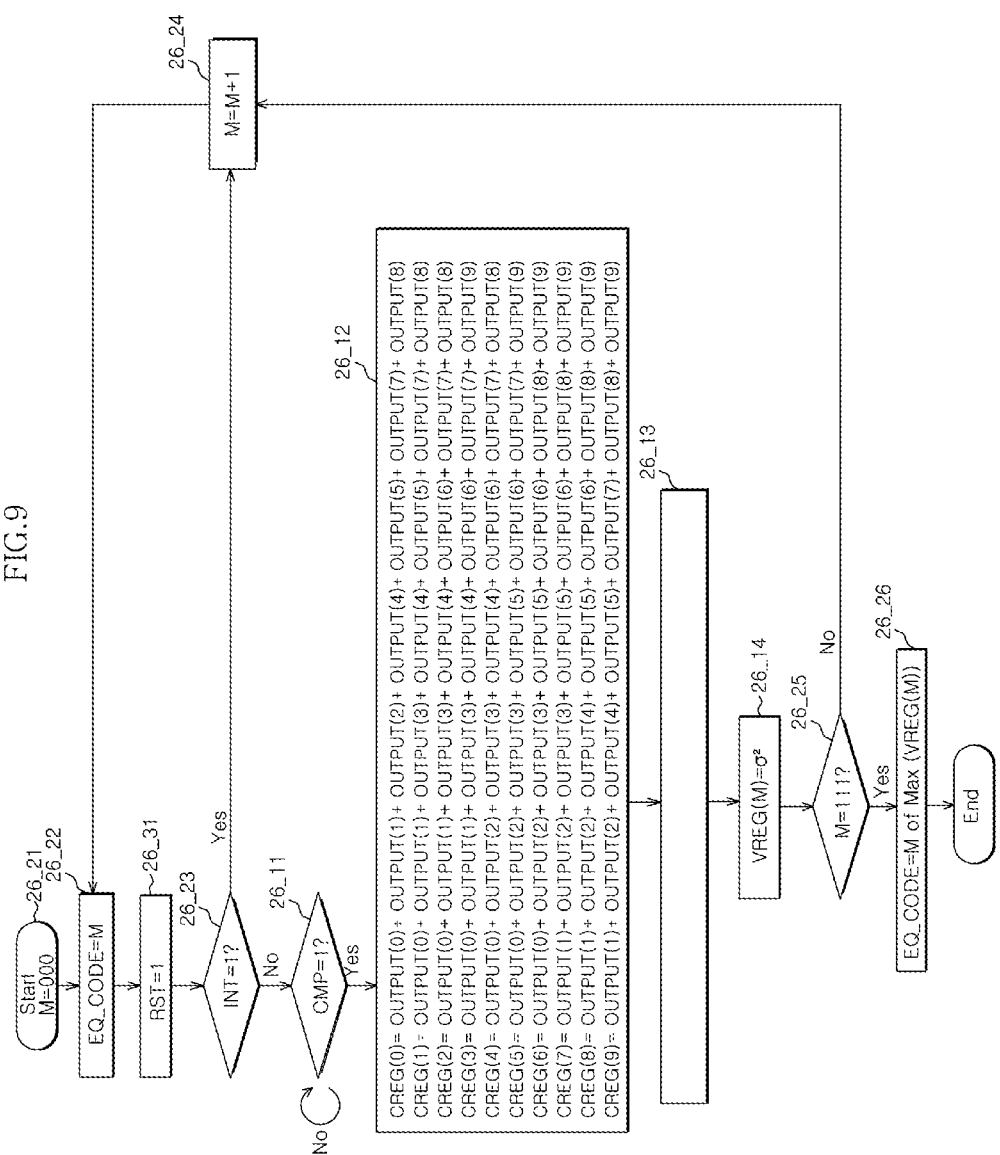
FIG. 9 is an exemplary flowchart showing detailed operations of the controller shown in FIG. 8.

FIG. 9 is an exemplary flowchart showing detailed operation of the controller 26 shown in FIG. 8.

When the data equalizing circuit as shown, for example, in FIGS. 3-8 starts to operate, a stored value M is set to zero (26_21). The control code setting part 26_2 sets the stored value M as the value of the control code EQ_CODE (26_22). The counter part 23_2 is reset by an initial reset signal RST (26_31). Thereafter, data transition frequencies OUTPUT(0~9) for the N calculation periods are counted by the counter part 23_2. When all of the data transition frequencies OUTPUT(0~9) for the respective N calculation periods are non-zero, the counting interruption signal INT is asserted (26_23). Accordingly, counting for a corresponding control code EQ_CODE is interrupted and the stored value M is changed to a next value (26_24). As long as the counting interruption signal INT is not asserted, counting continues until the end of count is reached. The end of count is indicated by the asserted counting completion signal CMP generated when each of the most significant bits OUTPUT(0~9)_MSB of the data transition frequencies OUTPUT(0~9) for the N calculation periods becomes 1 (26_11).

In the case where the asserted counting completion signal CMP is inputted to the dispersion calculating part 26_1, data transition frequencies CREG(0~9) are calculated using the data transition frequencies OUTPUT(0~9) for the N calculation periods (26_12), and dispersions $\sigma^2$ are calculated using the data transition frequencies CREG(0~9) for the N calculation periods (26_13).

An equation that may be used for calculating the data transition frequencies CREG(0~9) for the N calculation periods will be described by exemplifying the data transition frequency CREG(1).

OUTPUT(0) is a value obtained by counting data transition frequency occurring during a first calculation period of 0.0 UI to 0.7 UI (FIG. 4) among the 10 calculation periods acquired by dividing 7 cycles of a data period by 10 (where n=7 and N=10). OUTPUT(1) to OUTPUT(9) are values obtained by counting data transition frequencies occurring during the respective remaining nine calculation periods.

CREG(0) has a value obtained by summing all data transition frequencies OUTPUT(0~9) for the calculation periods that include the period of 0 UI to 0.1 UI among the periods divided from 1 UI data.

In other words, CREG(0) has a value obtained by summing OUTPUT(0) of the 0 UI to 0.7 UI period, OUTPUT(1) of the 0.7 UI to 1.4 UI period, OUTPUT(2) of the 1.4 UI to 2.1 UI period, OUTPUT(4) of the 2.8 UI to 3.5 UI period, OUTPUT(5) of the 3.5 UI to 4.2 UI period, OUTPUT(7) of the 4.9 UI to 5.6 UI period, and OUTPUT(8) of the 5.6 UI to 6.3 UI period.

CREG(1) has a value obtained by summing all data transition frequencies OUTPUT(0~9) for the calculation periods that include the period of 0.1 UI to 0.2 UI among the periods divided from the 1 UI data. CREG(2) has a value obtained by summing all data transition frequencies OUTPUT(0~9) for the calculation periods that include the period of 0.2 UI to 0.3 UI among the periods divided from the 1 UI data. CREG(3) has a value obtained by summing all data transition frequencies OUTPUT(0~9) for the calculation periods that include the period of 0.3 UI to 0.4 UI among the periods divided from the 1 UI data. CREG(4) has a value obtained by summing all data transition frequencies OUTPUT(0~9) for the calculation periods that include the period of 0.4 UI to 0.5 UI among the periods divided from the 1 UI data. CREG(5) has a value obtained by summing all data transition frequencies OUTPUT(0~9) for the calculation periods that include the period of 0.5 UI to 0.6 UI among the periods divided from the 1 UI data. CREG(6) has a value obtained by summing all data transition frequencies OUTPUT(0~9) for the calculation periods that include the period of 0.6 UI to 0.7 UI among the periods divided from the 1 UI data. CREG(7) has a value obtained by summing all data transition frequencies OUTPUT(0~9) for the calculation periods that include the period of 0.7 UI to 0.8 UI among the periods divided from the 1 UI data. CREG(8) has a value obtained by summing all data transition frequencies OUTPUT(0~9) for the calculation periods that include the period of 0.8 UI to 0.9 UI among the periods divided from the 1 UI data. CREG(9) has a value obtained by summing all data transition frequencies OUTPUT(0~9) for the calculation periods that include the period of 0.9 UI to 1.0 UI among the periods divided from the 1 UI data.

This can be written as follows for the data transition frequencies CREG(0~9).

CREG(0)=OUTPUT(0)+OUTPUT(1)+OUTPUT(2)+OUTPUT(4)+OUTPUT(5)+OUTPUT(7)+OUTPUT(8)
CREG(1)=OUTPUT(0)+OUTPUT(1)+OUTPUT(3)+OUTPUT(4)+OUTPUT(5)+OUTPUT(7)+OUTPUT(8)
CREG(2)=OUTPUT(0)+OUTPUT(1)+OUTPUT(3)+OUTPUT(4)+OUTPUT(6)+OUTPUT(7)+OUTPUT(8)
CREG(3)=OUTPUT(0)+OUTPUT(1)+OUTPUT(3)+OUTPUT(4)+OUTPUT(6)+OUTPUT(7)+OUTPUT(9)
CREG(4)=OUTPUT(0)+OUTPUT(2)+OUTPUT(3)+OUTPUT(4)+OUTPUT(6)+OUTPUT(7)+OUTPUT(8)

CREG(5)=OUTPUT(0)+OUTPUT(2)+OUTPUT(3)+OUTPUT(5)+OUTPUT(6)+OUTPUT(7)+OUTPUT(9)
CREG(6)=OUTPUT(0)+OUTPUT(2)+OUTPUT(3)+OUTPUT(5)+OUTPUT(6)+OUTPUT(8)+OUTPUT(9)
CREG(7)=OUTPUT(1)+OUTPUT(2)+OUTPUT(3)+OUTPUT(5)+OUTPUT(6)+OUTPUT(8)+OUTPUT(9)
CREG(8)=OUTPUT(1)+OUTPUT(2)+OUTPUT(4)+OUTPUT(5)+OUTPUT(6)+OUTPUT(8)+OUTPUT(9)
CREG(9)=OUTPUT(1)+OUTPUT(2)+OUTPUT(4)+OUTPUT(5)+OUTPUT(7)+OUTPUT(8)+OUTPUT(9)

Since a scheme for calculating the dispersions $\sigma^2$ is generally known in the art, a detailed description will be omitted.

The dispersion calculating part 26_1 outputs the dispersion $\sigma^2$ as a dispersion value VREG(M) for the corresponding control code EQ_CODE(M) (26_14). The control code setting part 26_2 receives and stores the dispersion value VREG(M) and checks whether the control code EQ_CODE(M) is the maximum value of, for example, '111' (26_25). If the control code EQ_CODE(M) is not the maximum value, the control code EQ_CODE(M) is incremented by 1 (M=M+1) (26_24). The counters in the counter part 23_2 are all reset, and the process is repeated for the incremented control code EQ_CODE(M).

If calculations are all completed up to a dispersion value VREG(M) corresponding to the maximum value for the control code EQ_CODE(M), the control code setting part 26_2 finds a largest value among all stored dispersion values VREG(M), and outputs the corresponding stored value M as the final control code EQ_CODE (26_26).

The equalizer 10 receives the control code EQ_CODE to correct the transformed data DATA_IN and outputs corrected data DATA_OUT.

As is apparent from the above descriptions, power consumption may be reduced and the burden on hardware may be lessened.

While certain embodiments have been described above, it will be understood to those skilled in the art that the embodiments described are by way of example only. Accordingly, the data equalizing circuit and the data equalizing method described should not be limited based on the described embodiments. Rather, the data equalizing circuit and the data equalizing method described should only be limited in light of the claims that follow when taken in conjunction with the above description and accompanying drawings.

What is claimed is:

1. A data equalizing circuit comprising:
   an equalizer configured to output data according to a control code; and
   a detection unit configured to divide the data into N number of calculation periods, count data transition frequencies for the N calculation periods, calculate dispersion values of the data transition frequencies for the N calculation periods, and output the control code corresponding to a largest dispersion value, in response to a counting interruption signal and a counting completion signal,
   wherein n is equal to or greater than 2, N is greater than n, and the data is divided to n number of unit intervals (UI), and
   wherein a phase shift of each of the calculation periods with respect to its corresponding UI is different from a phase shift of any of the other calculation periods with respect to its corresponding UI.

2. The data equalizing circuit according to claim 1, wherein the detection unit comprises:
   a multi-phase locked loop configured to receive a reference clock and output N number of clocks that correspond to the N calculation periods;
   a data latching section configured to store the data as N number of latched data in synchronization with the N number of clocks, respectively;
   a data transition counting section configured to compare adjacent values of the N number of latched data and count the data transition frequencies for the calculation periods;
   a counting interruption signal generating section configured to generate the counting interruption signal in response to the data transition frequencies for the calculation periods;
   a counting completion signal generating section configured to generate the counting completion signal when counting of the data transition frequencies for the calculation periods is completed; and
   a controller configured to calculate and store the dispersion values for the calculation periods in response to at least one of the counting completion signal and the counting interruption signal while changing the control code, and output the control code corresponding to a largest dispersion value.

3. The data equalizing circuit according to claim 2, wherein the data transition counting section comprises:
   a comparison part configured to compare adjacent values of the N number of latched data and generate N number of comparison signals; and
   a counter part configured to respectively count the N number of comparison signals and output the data transition frequencies for the calculation periods.

4. The data equalizing circuit according to claim 3, wherein the comparison part asserts an output signal to a value of logical one when the adjacent values of the latched data are different.

5. The data equalizing circuit according to claim 2, wherein the counting interruption signal generating section asserts the counting interruption signal to a logical one when counts of all of the data transition frequencies for the calculation periods is non-zero.

6. The data equalizing circuit according to claim 2, wherein the counting completion signal generation section asserts the counting completions signal to a logical one, when a value of a most significant bit of any one of the data transition frequencies for the calculation periods is 1.

7. The data equalizing circuit according to claim 2, wherein the controller comprises:
   a dispersion calculating part configured to receive the data transition frequencies for the calculation periods when the counting completion signal is asserted, and calculate and output the dispersion values of the data transition frequencies for the calculation periods; and
   a control code setting part configured to store the dispersion values for respective values of the control code while changing the control code, change the control code to a next value when the counting interruption signal is asserted, and output the control code corresponding to the largest dispersion value.

8. The data equalizing circuit according to claim 7, wherein the data transition counting section initializes counted data transition frequencies for the calculation periods in response to a reset signal.

9. The data equalizing circuit according to claim 8, wherein the controller further comprises:
   a reset signal generating part configured to assert the reset signal to a logical one when the control code setting part changes the value of the control code.

10. A data equalizing method suitable for controlling a correction degree of a data eye in response to a value of a control code with a plurality of bits, comprising:

dividing data into N number of calculation periods, and counting data transition frequencies for the N calculation periods while changing the value of the control code, and interrupting the counting for a corresponding control code when counts of all of the data transition frequencies for the calculation periods is non-zero, while performing the counting;

calculating dispersion values of data transition frequencies for the calculation periods of the data from the data transition frequencies according to respective values of the control code; and outputting the value of the control code when a dispersion value is largest among the dispersion values of the data transition frequencies for the calculation periods, as a final control code, wherein the calculating of the dispersion values is not performed for the corresponding control code for which the counting is interrupted, and wherein n is equal to or greater than 2, N is greater than n, and the data is divided to n number of unit intervals (UI), and wherein a phase shift of each of the calculation periods with respect to its corresponding UI is different from a phase shift of any of the other calculation periods with respect to its corresponding UI.

11. The data equalizing method according to claim 10, wherein the counting of the data transition frequencies for the calculation periods comprises:

receiving a reference clock and outputting N number of clocks that correspond to the N calculation periods;

storing the data as N number of latched data in synchronization with the N number of clocks, respectively; and comparing adjacent values of the N number of latched data and counting the data transition frequencies for the calculation periods.

12. The data equalizing method according to claim 10, wherein, in calculating the dispersion values, the data transition frequencies for the calculation periods are summed for the respective calculation periods of the data, and the dispersion values of summed results for the respective calculating periods are calculated.

* * * * *